(12) United States Patent
Hong et al.

(10) Patent No.: US 6,892,199 B2
(45) Date of Patent: May 10, 2005

(54) SAVING BURST DATA BY USING SEMI-MERGE SORTING MODULE

(75) Inventors: Jianrong Hong, Plantation, FL (US); Lin Yu, Fort Lauderdale, FL (US)

(73) Assignee: Trendium, Inc., Fort Lauderdale, FL (US)

(*) Notice: Subject to any disclaimer, the term of this patent is extended or adjusted under 35 U.S.C. 154(b) by 404 days.

(21) Appl. No.: 09/896,040

(22) Filed: Jun. 29, 2001

(65) Prior Publication Data

US 2003/0004949 A1 Jan. 2, 2003

(51) Int. Cl.$^7$ .............................................. G06F 17/30
(52) U.S. Cl. ........................................... 707/7; 707/10
(58) Field of Search .......... 707/1–104.1; 709/202–226; 372/83, 88; 717/126; 358/1.15, 1.13, 296

(56) References Cited

U.S. PATENT DOCUMENTS 5,742,772 A * 4/1998 Sreenan ...................... 709/226
6,058,389 A    5/2000 Chandra et al.

FOREIGN PATENT DOCUMENTS

EP    0 623 877 A2    11/1994

OTHER PUBLICATIONS

*Unix® Products, Installation Guide, Version 7.21*, Informix Software, Inc., Aug. 1996, Part No. 000–3627.

*Informix C–ISAM DataBlade Module, User's Guide, Version 1.0*, Informix Software, Inc., Dec. 1999, Part No. 000–6498.

*C–ISAM® Indexed Sequential Access Method, Programmer's Manual, Version 7.2*, Informix Software, Inc., Apr. 1996, Part No. 000–7897A.

International Search Report, PCT/US02/06506, Jul. 29, 2003.

Barclay et al., *Loading Databases Using Dataflow Parallelism*, SIGMOD Record, Association for Computing Machinery, vol. 23, No. 4, Dec. 31, 1994, pp. 72–83.

Gray et al., *Transaction Processing: Concepts and Techniques*, 1993, pp. 333–347, 496–499.

* cited by examiner

*Primary Examiner*—Uyen Le
*Assistant Examiner*—Susan Y Chen
(74) *Attorney, Agent, or Firm*—Myers Bigel Sibley & Sajovec (57) ABSTRACT

Systems, methods and computer program products for storing data from multiple clients in a database include a Multi-thread Shared Memory message Queue Buffer (MSMQB) that includes multiple First-In First-Out (FIFO) queues, a respective one of which is associated with a respective one of the clients. The MSMQB is configured to store sequential bursts of data records that are received from the clients in the associated FIFO queues. A Semi-Merge Sort Module (SMSM) is configured to sort the sequential bursts in the FIFO queues based on the primary key of at least one selected record but not every record, to produce a semi-sorted record stream for serially stored in the database.

52 Claims, 5 Drawing Sheets

SAVING BURST DATA BY USING SEMI-MERGE SORTING MODULE

FIELD OF THE INVENTION

This invention relates to data processing systems, methods and computer program products, and more particularly to database systems, methods and computer program products.

BACKGROUND OF THE INVENTION

Database systems, methods and computer program products are widely used for information management. More specifically, database systems, methods and computer program products may be used to reliably manage a large amount of data in a single-user or a multi-user environment. Database systems, methods and computer program products generally include a database that actually stores the data, a database management system and one or more applications that interface with the database management system to provide, for example, user interfaces and other applications.

As is well known to those having skill in the art, relational databases may be provided that are based on a table-column concept, set theoretic relations and/or relational algebra. One widely-available relational database is the Oracle8i relational database system that is marketed by Oracle Corporation. Other database systems may not be based on the above-mentioned attributes, so that they are not relational databases. For example, Indexed Sequential Access Method (C-ISAM) is a database that is marketed by Informix Software, Inc., that is not a relational database. See, for example, the Informix C-ISAM DataBlade Module User's Guide, Version 1.0, December 1999, Part No. 000-6498. Both relational and non-relational databases may be used to manage a large amount of data.

As is well known to those having skill in the art, databases generally facilitate database queries by building an index file in addition to storing the data in a data file. For very large databases, it may be desirable to manage creation of the index file and the data file, to handle large volumes of data.

One application of very large database systems is to store and manage temporal data, i.e., data that is collected over time. Temporal data also may be referred to as "historical" data that describes the business transactions of an enterprise over intervals of time. For example, in Internet-related applications, a mechanism, referred to as "flow", may be used to establish connection-oriented end-to-end Internet service that behaves as if the two ends are physically connected. More specifically, in Asynchronous Transfer Mode (ATM) technology, flow can be in the form of a Virtual Circuit (VC). Flow also can be in the form of Private Virtual Path (PVP). Flow data may be used to monitor quality of service (QoS) on network service providers, backbone or otherwise. Flow data may be collected over a series of time intervals, the duration of which may be set based upon service provider and/or customer desires.

Thus, for example, in a service management system, such as a quality of service monitoring system, network quality service performance data may be collected by multiple collection servers across multiple domains, such as across several Internet service providers. Each collection server may include many collection clients, that directly connect quality of service data from network elements, such as routers, switches and bridges.

Figure 1:
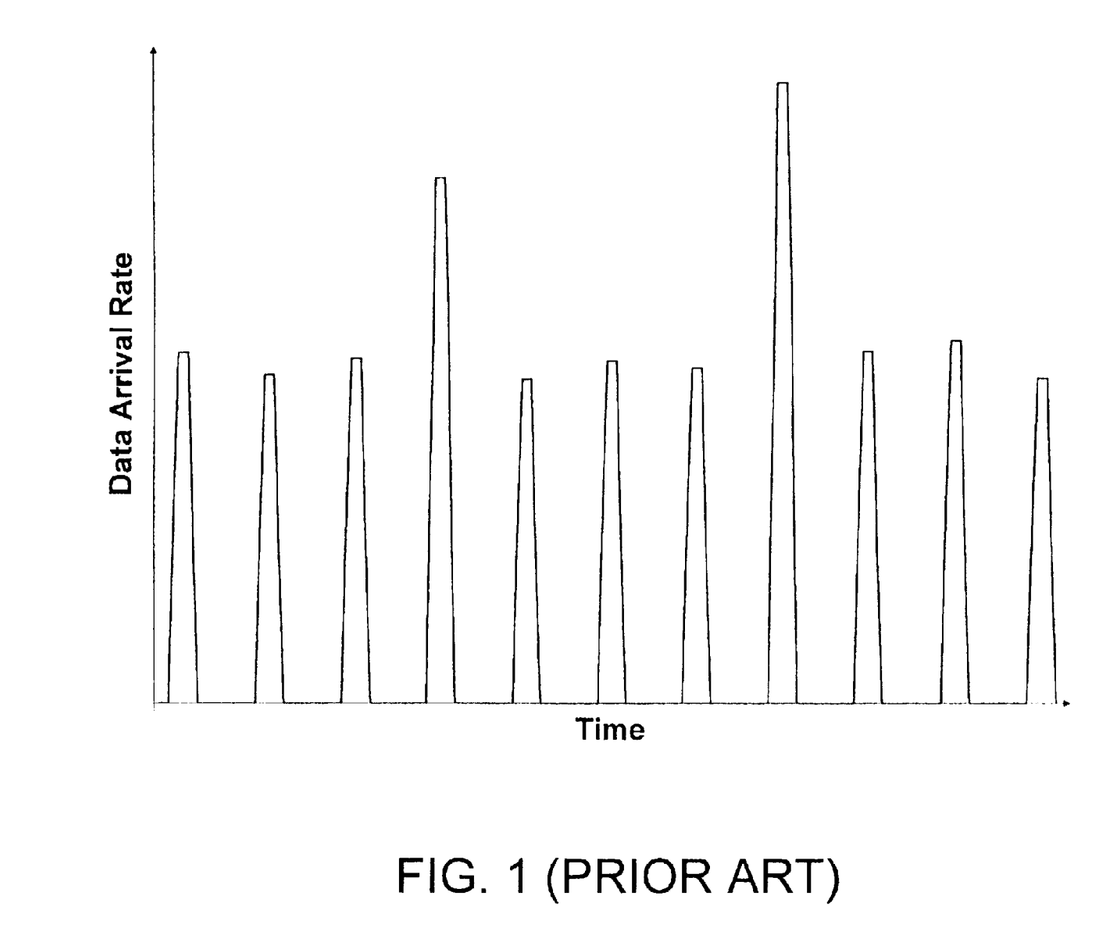
FIG. 1 graphically illustrates data arrival rate versus time for bursts of data records, such as flow data.

Since quality of service performance data and/or other temporal data may be collected over a series of time intervals, the data may be received as temporally spaced apart bursts of data records. For example, FIG. 1 graphically illustrates data arrival rate versus time for data records, such as flow data. As shown in FIG. 1, large amounts of data are received during a burst of time and no or relatively small amounts of data are received between the bursts of time. The bursts are shown in FIG. 1 to be equally spaced apart. However, in other scenarios, the bursts need not be equally spaced apart, and also need not be of equal burst length. As also shown in FIG. 1, the same amount of data need not be received during each burst.

Unfortunately, it may be difficult for databases to efficiently store temporally spaced apart bursts of data records. Moreover, these difficulties may be exacerbated when the number of bursts, the number of data records per burst and/or the number of sources of the bursts of data records become large.

Service management systems generally operate in a multiple client environment, to accommodate desired network service monitoring. Thus, service management systems may need to be able to handle large numbers of threads through which each of the multiple clients transmits large numbers of spaced apart bursts of data records. A service management system may allocate a dedicated thread per client. The service management system generally maintains its data in a database repository using a conventional relational and/or non-relational database management system to store the data. The data may arrive at the database in very large quantities. Moreover, multiple service requests may be sent from multiple collection servers simultaneously in real time, where each collection server sends high volumes of data in bursts at spaced apart times, as was shown in FIG. 1. In order to provide desired network monitoring performance and/or throughput, it therefore may be desirable to allow the database to handle multiple threads with high efficiency.

It is known to provide concurrency control for databases, by serializing read/write requests to reduce or prevent database collisions. However, database collisions may not be a primary consideration in the service management arena, because the quality of service performance data may only be written into the database by the collection servers, and the collection servers may not submit queries to the database. Also, since the quality of service performance data is historical in nature, it generally is not modified after being written into the database. Hence, there may not be read-write or write-write collisions Thus, database collisions and/or concurrency control may not be of prime concern. Rather, it may be desirable to provide an environment wherein high database storing throughput may be accommodated, to accommodate peak burst data from multiple clients.

SUMMARY OF THE INVENTION

Embodiments of the present invention provide systems, methods and/or computer program products for storing data from a plurality of clients in a database. A Multi-thread Shared Memory message Queue Buffer (MSMQB) is provided that includes a plurality of First-In First-Out (FIFO) queues, a respective one of which is associated with a respective one of the plurality of clients. The MSMQB is configured to store sequential bursts of data records that are received from the plurality of clients in the plurality of FIFO queues that are associated therewith. The data records in the sequential bursts are sorted by a primary key. A Semi-Merge Sort Module (SMSM) also is provided that is responsive to the plurality of FIFO queues in the MSMQB. The SMSM is configured to sort the first sequential bursts in the plurality of FIFO queues based on the primary key of at least one selected record therein, to produce a semi-sorted record stream. The SMSM also is configured to serially store the semi-sorted record stream into the database. Embodiments of the invention can allow a database to handle multiple clients and multiple bursts for high throughput writing of data into the database. Moreover, by performing a semi-merge sort, the records may be placed into the record stream based on the value of the primary key of at least one selected record therein, so that an efficient semi-sort may be provided.

In other embodiments of the invention, the SMSM is configured to produce the semi-sorted record stream as a series of data files, and to serially store the series of data files in the database. In other embodiments, an index builder also may be provided that is configured to build an index for the semi-sorted record stream and to store the index in the database. In yet other embodiments, a configuration module also is provided that is configured to specify a directory path for the data files and the index files, and to provide the directory path to the SMSM and to the index builder. In still other embodiments, a notification module also is provided that is responsive to storing a sequential burst of data records that is received from one of the clients in one of the FIFO queues that is associated therewith, and that is configured to notify the SMSM to produce a semi-sorted record stream.

In some embodiments of the present invention, the primary key that is used is a timestamp that indicates a time when a record was created. However, other primary keys may be used for the semi-sort. Moreover, in some embodiments, the at least one selected record in the first sequential burst in each FIFO queue comprises the first record in the first sequential burst in each FIFO queue. However, in other embodiments, selected multiple records and/or a selected record other than the first record, may be used for the merge. Accordingly, embodiments of the present invention can allow large volumes of data records to be accepted from multiple clients and stored in a database. High throughput and/or high efficiency thereby may be provided.

It will be understood that embodiments of the present invention may be provided as methods, systems and/or computer program products that may be embodied as one or more modules that execute on and interface with a database management system. Alternatively, systems, methods and/or computer program products according to embodiments of the present invention may be embodied as one or more modules that are integrated into a database management system. Systems, methods and/or computer program products according to embodiments of the present invention may execute in a mainframe environment, and/or in a client/server environment and/or in distributed database environment. Finally, systems, methods and/or computer program products according to embodiments of the invention may be used with any database system that stores temporal data, including Oracle, marketed by Oracle Corporation; C-ISAM, marketed by Informix Software, Inc.; Sybase, marketed by Sybase, Inc.; Ingres marketed by Computer Associates International, Inc. and DB2, marketed by IBM Corporation. Improved performance, manageability, availability, configurability, flexibility, scalability and/or maintainability thereby may be provided.

DETAILED DESCRIPTION OF THE PREFERRED EMBODIMENT

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As also will be appreciated by one of skill in the art, the present invention may be embodied as methods, data processing systems, and/or computer program products. Accordingly, the present invention may take the form of an entirely hardware embodiment, an entirely software embodiment running on general purpose hardware or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet and/or magnetic storage devices.

Computer program code for carrying out operations of the present invention may be written in an object oriented programming language such as JAVA®, Smalltalk or C++. The computer program code for carrying out operations of the present invention may also be written in conventional procedural programming languages, such as "C", or in various other programming languages. Software embodiments of the present invention do not depend on implementation with a particular programming language. Portions of the program code may execute entirely on one or more data processing systems.

Figure 2:
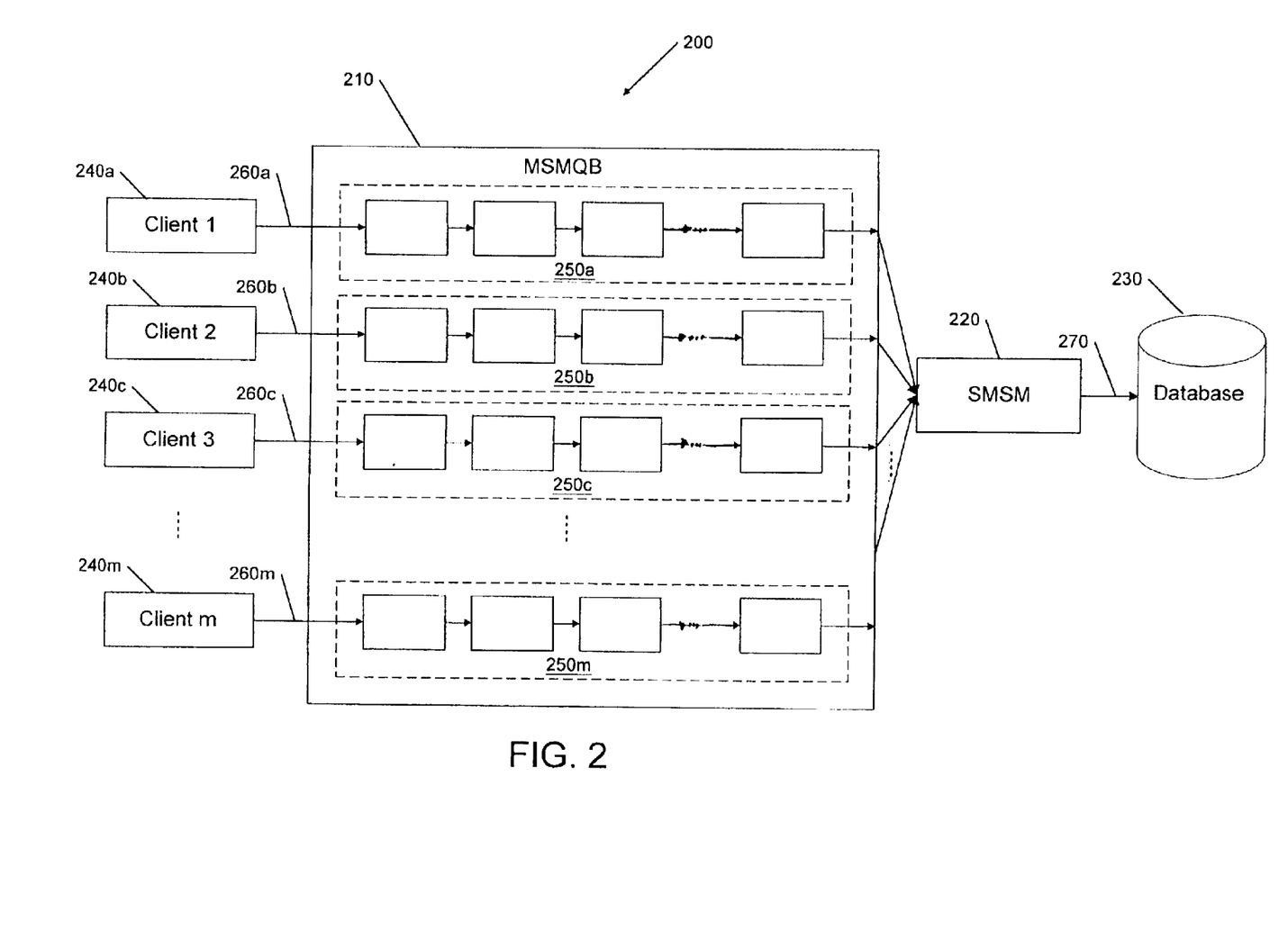
FIGS. 2 and 3 are block diagrams of systems, methods and/or computer program products for storing data from a plurality of clients in a database according to embodiments of the present invention.

Referring now to FIG. 2, a block diagram of systems, methods and/or computer program products for storing data from a plurality of clients in a database according to embodiments of the present invention now will be described. As shown in FIG. 2, systems, methods and/or computer program products 200 according to embodiments of the present invention include a database 230 that stores the data from the plurality of clients 240a–240m, for example service management data records 260a–260m from a plurality of collection agent clients at network elements. The design and operation of clients 240, such collection agents, and the database 230, are well known to those having skill in the art and need not be described in detail herein. Moreover, the clients and/or the database may be embodied in a lumped system, a distributed system and/or a client server system, and may be directly connected to one another and/or may be connected via a network including public and/or private, local and/or wide area networks, such as the Internet.

Still referring to FIG. 2, a Multi-thread Shared Memory message Queue Buffer (MSMQB) 210 also is provided, that includes a plurality of First-In First-Out (FIFO) queues 250a–250m, a respective one of which is associated with a respective one of the plurality of clients 240a–240m. The design and operation of a FIFO queue are well known to those having skill in the art, and need not be described in further detail herein. The MSMQB 210 is configured to store sequential bursts of data records 260a–260m that are received from a plurality of clients 240a–240m in the plurality of FIFO queues 250a–250m that are associated therewith. The respective sequential bursts of data records 260a–260m for a respective client 240a–240m may be associated with a separate thread for the MSMQB 210.

Still referring to FIG. 2, the data records in the sequential bursts of data records 260a–260m generally are sorted by a primary key by the clients 240a–240m, such as collection agents. For example, the primary key may be a timestamp that records the time the information in the record is composed, captured and/or generated. Another primary key may be an identification key, such as a Service Description ID, or other ID, which can include any form of identification number that can identify a record. The association of timestamps and/or identification numbers with data records is well known to those having skill in the art, and need not be described further herein. Moreover, the use of timestamps and/or identification numbers as a primary key in a burst of data records also is well known to those having skill in the art and need not be described further herein. It also will be understood that combinations of timestamps, IDs and/or other elements may be used as a primary key.

Still referring to FIG. 2, a Semi-Merged Sort Module (SMSM) also is provided, that is responsive to the plurality of FIFO queues 250a–250m in the MSMQB 210. It will be understood that as used herein, the term "module" denotes functionality that may be embodied in one or more hardware, process and/or software elements, and/or portions thereof. It also will be understood that some or all of the functionality of the MSMQB 210 and the SMSM 220 may be integrated into one or more common modules.

The SMSM 220 is configured to sort the first sequential bursts in the plurality of FIFO queues by the primary key of at least one selected record therein, to produce a semi-sorted record stream 270. The semi-sorted record stream 270 is serially stored in the database 230, for example using a conventional database management system. In some embodiments of the invention, the at least one selected record in the first sequential burst in the plurality of FIFO queues comprises the first record in the first sequential burst in the plurality of FIFO queues. In other embodiments, a record other than the first record and/or combinations of records, which may include the first record, are used as the selected record(s) for the semi-merged sort.

A more detailed description of embodiments of a semi-merged sort that is performed by the SMSM now will be provided. As was already described in connection with the MSMQB 210, the data records in the sequential bursts of data 260a–260m generally are sorted by a primary key such as a timestamp. However, in merging the outputs of the FIFO queues 250a–250m to produce the record stream 270, the SMSM does not sort every record in first sequential bursts of the FIFO queues 250a–250m by the primary key. Rather, the bursts in the FIFO queues 250a–250m may be merged based upon a sort of one or more selected records, but less than all of the records in the first sequential burst in each FIFO queue. Thus, for example, a rough time sequence merging may be provided by sorting on the timestamp of the first record of the first sequential bursts in each FIFO queue. This rough time sort may not guarantee that every data record has been sorted by time, because some of the other records in the FIFO queues may overlap in time. However, a rough sort based on the timestamp of at least one selected record, such as the first record, may be used to efficiently merge the outputs of the FIFO queues into a single semi-sorted record stream 270.

It will be understood that the MSMQB 210 may be embodied in disk storage. In other embodiments, the MSMQB 210 may be embodied in hardware using conventional FIFO integrated circuits. In still other embodiments, MSMQB 210 may be embodied in solid-state memory, such as Dynamic Random Access Memory (DRAM) and/or Static Random Access Memory (SRAM). It may be preferable to embody MSMQB 210 in FIFO integrated circuits and/or solid-state memory, such as DRAM and/or SRAM, in order to reduce disk I/O, and thereby allow increased throughput. Moreover, multi-threads may be more readily handled in solid-state circuitry than on a disk file. Similarly, the SMSM 220 also may be embodied in disk storage in some embodiments, but also may be embodied using dedicated hardware and/or software executing in solid-state memory, so as to allow increased throughput.

Figure 3:
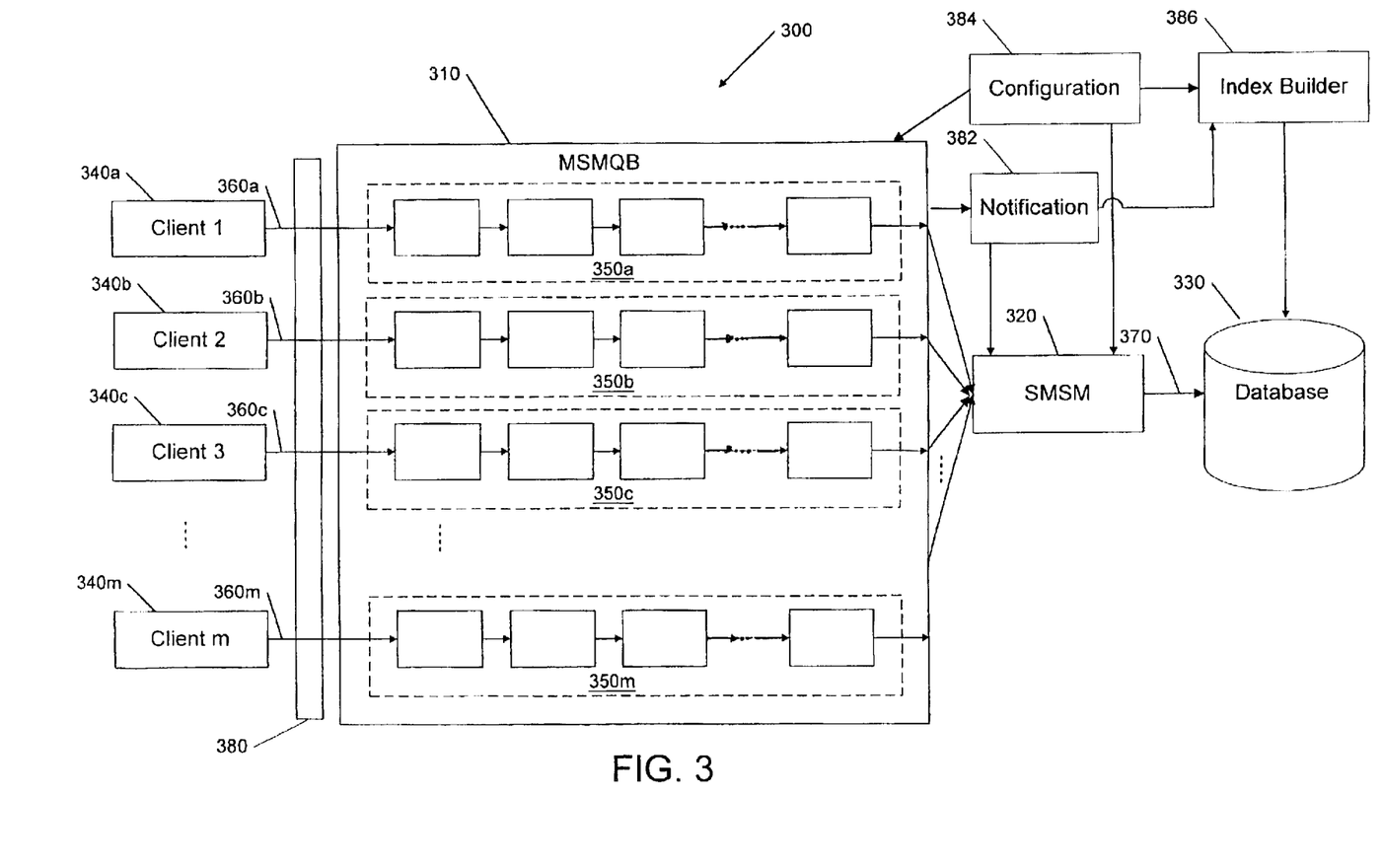

FIG. 3 is a block diagram of other systems, methods and/or computer products according to embodiments of the present invention. As shown in FIG. 3, these systems, methods and/or computer program products 300 may include a plurality of clients 340a–340m that may correspond to clients 240a–240m of FIG. 2, and need not be described further herein. An MSMQB 310 may correspond to the MSMQB 210 of FIG. 2, and may include a plurality of FIFO queues 350a–350m, that may correspond to the plurality of FIFO queues 250a–250m of FIG. 2, and need not be described further herein. An SMSM 320 also is provided that may correspond to the SMSM 220 of FIG. 2, and need not be described further herein, and which may produce a semi-sorted record stream 370 that may correspond to the semi-sorted record stream 270 of FIG. 2. The semi-sorted record stream 370 may be stored in a database 330, that may correspond to the database 230 of FIG. 2, and need not be described further herein.

Still referring to FIG. 3, in some embodiments of the invention, the SMSM 320 is configured to produce the semi-sorted record stream 370 as a series of data files, and to serially store the series of data files in the database 330. In some embodiments, an index builder module 386 also may be provided that is configured to build an index for the semi-sorted record stream 370 and to store the index in the database 330. In other embodiments, the index builder module 386 is configured to build an index file for each of the data files, and to store the index file in the database 330.

In yet other embodiments, a configuration module 384 also may be provided that is configured to specify a directory path for the data file and the index file, and to provide the directory path to the SMSM 320 and to the index builder module 386. The configuration module 384 also may be configured to specify the configuration information that is used to configure the MSMQB 310. In particular, the size of the MSMQB may be configured, for example, as to the number of FIFO queues 350a–350m, and the number of sequences of records corresponding to the blocks in each FIFO queue 350a–350m. Finally, the configuration file 384 also may indicate to the SMSM how the MSMQB 310 is configured, so that these two components can cooperate with each other.

In still other embodiments, a notification module 382 also is provided that is responsive to storing a sequential burst of data records that is received from one of the clients 340a–340m in one of the FIFO queues 350a–350m that is associated therewith. The notification module 382 is configured to notify the SMSM 320 to produce the semi-sorted record stream 370. More specifically, the notification module 382 can notify the SMSM 370 of the arrival of new sequential bursts of data records. As long as the MSMQB 310 is not empty, the SMSM can continuously process sequential bursts of data records from the MSMQB 310. Moreover, when the SMSM 320 completes writing a data file, the notification module 382 can notify the index builder 386 to begin building the index file for the data file. It will be understood that the functionality of the MSMQB 310, SMSM 320, notification module 382, configuration module 384 and/or index builder 386, and/or elements thereof, may be integrated into one or more hardware and/or software elements and/or may be maintained as separate hardware and/or software elements.

In still other embodiments, an interface, such as a Common Object Request Broker Architecture (CORBA) interface 380 may be provided, to interface between the clients 340a–340m and the MSMQB 310, so as to allow a platform-independent interface for various platform-dependent applications. The CORBA interface may utilize a UNIX process known as a thin client, to generate the threads for the clients 340a–340m. The use of CORBA as an interface is well known to those having skill in the art and need not be described further herein. Other interface architectures also may be used. An interface also need not be used.

Still referring to FIG. 3, in other embodiments, each of the clients 340a–340m may include a collection agent that is configured to collect the sequential bursts of data records and to transmit the sequential bursts of data records 340a–340m that are collected to the MSMQB 310. Finally, in yet other embodiments, the sequential bursts of data records from the plurality of clients 340a–340m may comprise Quality of Service (QoS) data from the plurality of clients.

Figure 4:
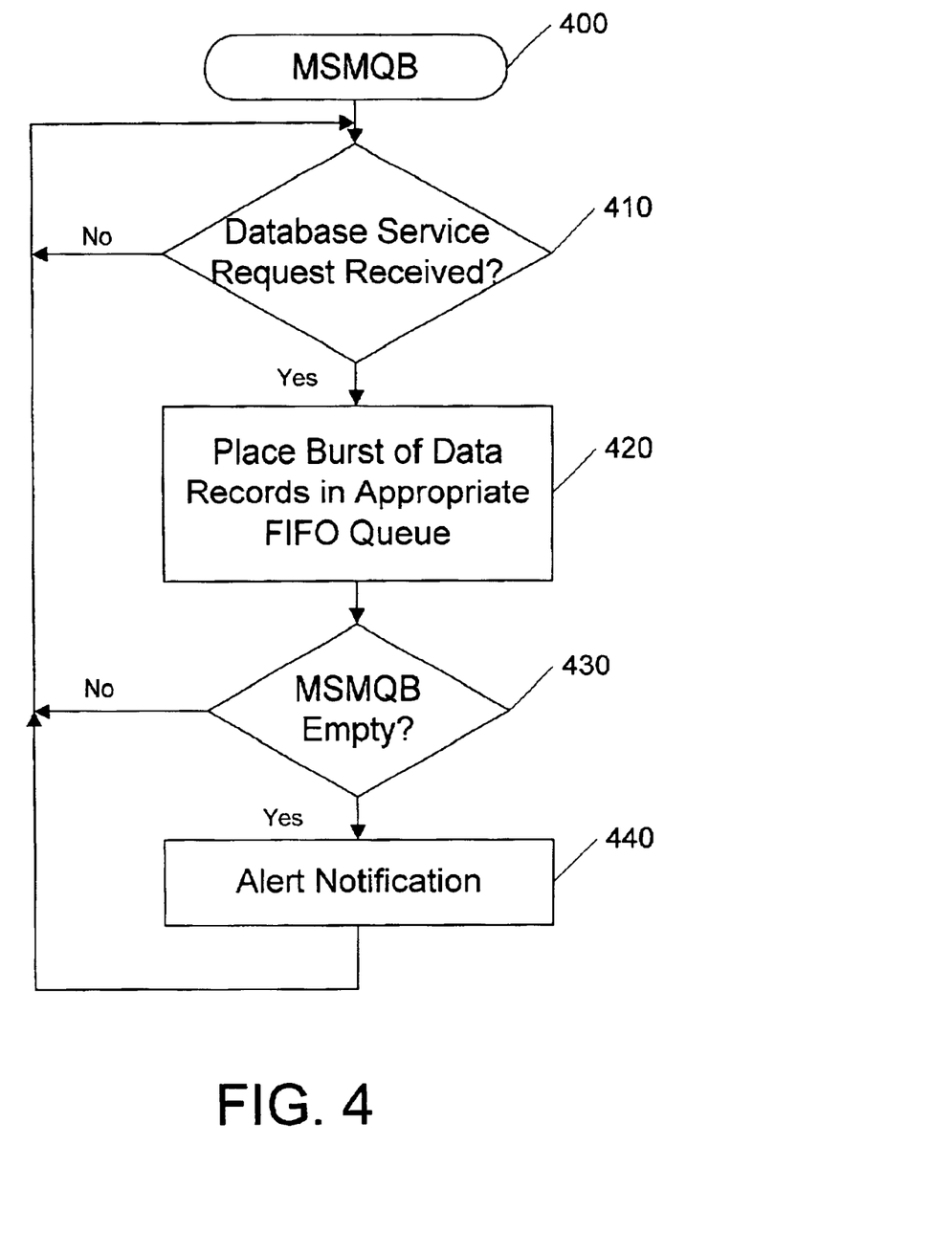
FIGS. 4 and 5 are flowcharts of operations that may be performed by systems, methods and/or computer program products according to embodiments of the invention.

FIG. 4 is a flowchart of operations that may be performed by embodiments of MSMQBs, such as MSMQB 310 of FIG. 3, according to embodiments of the present invention. Referring to FIG. 4, these operations 400 begin when a database service request is received at the MSMQB 310, directly from one of the plurality of clients, such as clients 340a–340m, and/or via a CORBA interface 380 and/or other intermediary interface. The database service request can comprise a request to store a burst of data records that are sorted by the primary key value, such as by a timestamp, an ID and/or other primary key value.

Referring now to Block 420, each burst of data records is placed in the appropriate FIFO queue, such as FIFO queue 350a–350m of FIG. 3. Then, at Block 430, assuming that the MSMQB 310 was empty prior to receiving the database service request at Block 410, a notification module, such as the notification module 382 of FIG. 3, is alerted at Block 440 to activate or wake up the SMSM 320, such as the SMSM 320 of FIG. 3. If the MSMQB was not empty at Block 430, then the SMSM may not need to be notified, and operations continue, to await a next database service request at Block 410. Thus, as long as there are service requests in the MSMQB 310, the SMSM 320 can continue to process these service requests. Once the MSMQB 310 is empty, the SMSM 320 can return to an inactive state until further notice from the notification module 382.

Figure 5:
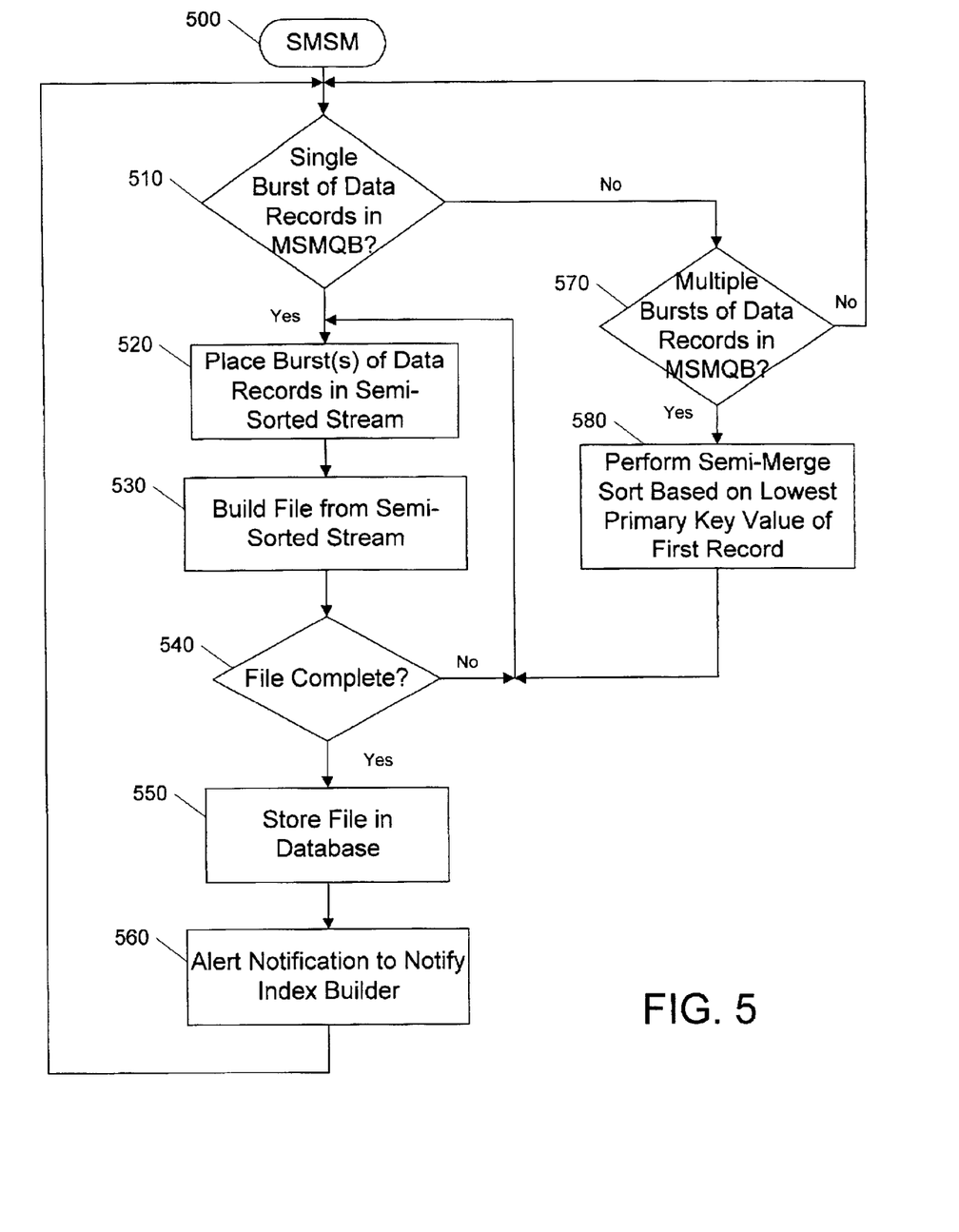

Referring now to FIG. 5, operations that may be performed by an SMSM, such as the SMSM 320 of FIG. 3, now will be described. As shown at FIG. 5, these operations 500 can begin by determining at Block 510 as to whether only a single burst of data records is in the MSMQB 310. If a single burst of data records is in the MSMQB 310, then at Block 520, the single burst of data records is placed in a semi-sorted stream, such as the semi-sorted stream 370 of FIG. 3. A file is built from the semi-sorted stream at Block 530. If the file is complete at Block 540, then the file is stored in the database, such as the database 330, at Block 550. The notification module 382 then may be alerted at Block 560, to notify an index builder, such as the index builder 386, to build the index file. On the other hand, if the file is not complete at Block 540, bursts of records continue to be placed in the semi-sorted stream at Block 520.

Referring again to Block 510 of FIG. 5, if a single record is not in the MSMQB at Block 510, then a test is made at Block 570 as to whether multiple bursts of data records are in the MSMQB, thus indicating that a semi-merge sort may need to be performed. If multiple bursts of data records are in the MSMQB at Block 570, then at Block 580, the SMSM performs a semi-merge sort based, for example, on the lowest primary key value of the first record in each of the FIFO queues.

More particularly, in processing service requests from the MSMQB 310, the SMSM 320 merges the bursts from multiple FIFO queues 350a–350m in the MSMQB 310 into a single stream of records before physically writing the records into the database 330, using a semi-merge sort. In some embodiments of a semi-merge sort, the SMSM 320 determines which burst is the next one to be put into the record stream 370 by examining the first record from the first sequential thread of each FIFO queue 350a–350m in the MSMQB 310. The first record that has the lowest key value is selected. It will be understood that if the same key value is present in two or more first records, an arbitrary tie-breaking scheme may be used to break ties. Thus, if the primary keys in two or more first records are identical, the burst from the lowest numbered FIFO queue 350a–350m may be selected.

It will be understood that the above-described merge sort is a semi-merge sort, because it does not sort all records in all bursts completely. Stated differently, although within each burst of data records the records are in sorted order, the same assumption may not be made about the data records in the semi-sorted record stream 370 across multiple sequences of data records. For example, if the primary key is a timestamp, the bursts of data records may be sorted based on the timestamp of the first records thereof. However, other records within a burst may be out-of-time sequence, relative to records in other bursts, because they may overlap in time.

A semi-merge sort may provide excellent near-linear time efficiency. For example, assuming there are m FIFO queues 350a–350m in the MSMQB 310, corresponding to m client processes, and there are a total of n records in each burst, the computational time complexity of a merge sort can be on the order of m x n. If the value of m is bounded by a constant, the complexity then can be on the order of n.

Finally, returning again to Block 570, if a single record is not in the MSMQB 310 at Block 510, and multiple bursts are not in the MSMQB 310 at Block 570, then no records are in the MSMQB 310. The SMSM 320 may return into an inactive mode until a further record is received at Block 510.

Additional discussion of potential advantages of systems, methods and/or computer program products according to embodiments of the present invention now will be provided. In particular, performance tests on an implementation of systems, methods and/or computer program products of FIG. 3 have indicated that at a 100% throughput improvement or more may be obtained when processing over 6,000 data records per second, compared to an architecture that relies on a commercial relational database management system to handle both the multi-thread front end and the back end data storing into the database at a rate of only 3,000 records per second.

Moreover, in service management systems, data records may arrive in very large quantities on a continuous basis. Also, the service requests from clients may come in bursts. By using systems, methods and/or computer program products according to embodiments of the invention, the impact of these burst characteristics of input may be moderated. Incoming traffic may be handled in real time, without choking the database management system. The turnaround time for service requests from clients may be reduced. The database repository server also can handle multiple clients and multiple threads, so that the server can service many concurrent clients. With one dedicated high-performance database write driver interfacing with the database, embodiments of the present invention can allow high performance processing of incoming quality of service performance data, which therefore can enhance scalability.

In conventional service management systems that use a buffer to moderate the impact of bursty input data, the data in the buffer area may actually first be stored in secondary storage, such as disk, before being recalled back into memory to be further processed. In contrast, some embodiments of the invention can embody the MSMQB in solid-state memory, such as SRAM and/or DRAM, without the need to first write the data into disk. The extra overhead of disk write and read operations can be reduced or avoided. Since disk I/O operations generally are much slower than processor operations, embodiments of the present invention may run at processor speed, to thereby allow higher throughput to be obtained.

Finally, in embodiments of the invention that use a notification module 382, the SMSM 320 need not waste time checking the status of the MSMQB 310. Overall performance of the SMSM 320 therefore also can be improved. The overall performance of the index builder 386 also can be improved.

The flowcharts and block diagrams of FIGS. 2–5 illustrate the architecture, functionality, and operation of possible implementations of systems, methods and computer program products according to embodiments of the invention. In this regard, each block in the flowcharts or block diagrams can represent a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A system for storing data from a plurality of clients in a database, comprising:

a Multi-thread Shared Memory message Queue Buffer (MSMQB) that includes a plurality of First-In-First-Out (FIFO) queues, a respective one of which is associated with a respective one of the plurality of clients, and that is configured to store sequential bursts of data records, which are received from the plurality of clients, in the plurality of FIFO queues that are associated therewith, the data records in the sequential bursts of data being sorted by a primary key; and a Semi-Merge Sort Module (SMSM) that is responsive to the plurality of FIFO queues in the MSMQB and that is configured to sort the sequential bursts in the plurality of FIFO queues based on the primary key of at least one selected record, but not every record, therein to produce a semi-sorted record stream that is roughly sorted based on the primary key of the at least one selected record, but not every record, and to serially store the semi-sorted record stream in the database.

2. A system according to claim 1 wherein the SMSM is further configured to produce the semi-sorted record stream as a series of data files and to serially store the series of data files in the database.

3. A system according to claim 1, further comprising:

an index builder that is configured to build an index for the semi-sorted record stream and to store the index in the database.

4. A system according to claim 2 further comprising:

an index builder that is configured to build an index file for each of the data files and to store the index files in the database.

5. A system according to claim 4 further comprising:

a configuration module that is configured to specify a directory path for the data files and the index files, and to provide the directory path to the SMSM and to the index builder.

6. A system according to claim 1 further comprising:

a notification module that is responsive to storing a sequential burst of data records that is received from one of the clients in one of the FIFO queues that is associated therewith, and that is configured to notify the SMSM to produce the semi-sorted record stream.

7. A system according to claim 3 further comprising:

a notification module that is responsive to storing a sequential burst of data records that is received from one of the clients in one of the FIFO queues that is associated therewith, and that is configured to notify the SMSM to produce the semi-sorted record stream and to notify the index builder to build the index.

8. A system according to claim 1 wherein the primary key is a timestamp.

9. A system according to claim 1 wherein the at least one selected record in the sequential burst in each FIFO queue comprises a first record in the sequential burst in each FIFO queue.

10. A system according to claim 1 further comprising a collection agent at each of the plurality of clients that is configured to collect the sequential bursts of data records from the respective client and to transmit the sequential bursts of data records that are collected to the MSMQB.

11. A system according to claim 1 wherein the sequential bursts of data records from the plurality of clients comprises Quality of Service (QoS) data from the plurality of clients.

12. A method for storing data from a plurality of clients in a database, comprising:

storing sequential bursts of data records, which are received from the plurality of clients, in a plurality of First-In First-Out (FIFO) queues, a respective one of which is associated with a respective one of the clients, the data records in the sequential bursts of data being sorted by a primary key;

semi-sorting the sequential bursts in the plurality of FIFO queues based on the primary key of at least one selected record, but not every record, therein to produce a semi-sorted record stream that is roughly sorted based on the primary key of the at least one selected record, but not every record; and serially storing the semi-sorted record stream in the database.

13. A method according to claim 12, wherein the semi-sorting produces the semi-sorted record stream as a series of data files and wherein the serially storing comprises serially storing the series of data files in the database.

14. A method according to claim 12 further comprising:
building an index for the semi-sorted record stream; and
storing the index in the database.

15. A method according to claim 13 further comprising:
building an index file for each of the data files; and
storing the index files in the database.

16. A method according to claim 15 further comprising:
specifying a directory path for the data files and the index files.

17. A method according to claim 12 further comprising:
initiating production of the semi-sorted record stream in response to the storing a sequential burst of data records that is received from one of the clients in one of the FIFO queues that is associated therewith.

18. A method according to claim 12 wherein the primary key is a timestamp.

19. A method according to claim 12 wherein the at least one selected record in the sequential burst in each FIFO queue comprises a first record in the sequential burst in each FIFO queue.

20. A method according to claim 12 wherein the storing sequential bursts of data is preceded by collecting the sequential bursts of data records from the respective client.

21. A method according to claim 12 wherein the sequential bursts of data records from the plurality of clients comprises Quality of Service (QoS) data from the plurality of clients.

22. A system for storing data from a plurality of clients in a database, comprising:
means for storing sequential bursts of data records, which are received from the plurality of clients, in a plurality of First-In First-Out (FIFO) queues, a respective one of which is associated with a respective one of the clients, the data records in the sequential bursts of data being sorted by a primary key;
means for semi-sorting the sequential bursts in the plurality of FIFO queues based on the primary key of at least one selected record, but not every record, therein to produce a semi-sorted record stream that is roughly sorted based on the primary key of the at least one selected record, but not every record; and
means for serially storing the semi-sorted record stream in the database.

23. A system according to claim 22 wherein the means for semi-sorting produces the semi-sorted record stream as a series of data files and wherein the means for serially storing comprises means for serially storing the series of data files in the database.

24. A system according to claim 22 further comprising:
means for building an index for the semi-sorted record stream; and
means for storing the index in the database.

25. A system according to claim 23 further comprising:
means for building an index file for each of the data files; and
means for storing the index files in the database.

26. A system according to claim 25 further comprising:
means for specifying a directory path for the data files and the index files.

27. A system according to claim 22 further comprising:
means for activating the means for semi-sorting in response to activating of the means for storing.

28. A system according to claim 22 wherein the primary key is a timestamp.

29. A system according to claim 22 wherein the at least one selected record in the sequential burst in each FIFO queue comprises a first record in the sequential burst in each FIFO queue.

30. A system according to claim 22 further comprising:
means for collecting the sequential bursts of data records from the respective client.

31. A system according to claim 22 wherein the sequential bursts of data records from the plurality of clients comprises Quality of Service (QoS) data from the plurality of clients.

32. A computer program product for storing data from a plurality of clients in a database, the computer program product comprising a computer-readable storage medium having computer-readable program code embodied in the medium, the computer-readable program code comprising:
computer-readable program code that is configured to provide a Multi-thread Shared Memory message Queue Buffer (MSMQB) that includes a plurality of First-In-First-Out (FIFO) queues, a respective one of which is associated with a respective one of the plurality of clients, and that is configured to store sequential bursts of data records, which are received from the plurality of clients, in the plurality of FIFO queues that are associated therewith, the data records in the sequential bursts of data being sorted by a primary key; and
computer-readable program code that is configured to provide a Semi-Merge Sort Module (SMSM) that is responsive to the plurality of FIFO queues in the MSMQB and that is configured to sort the sequential bursts in the plurality of FIFO queues based on the primary key of at least one selected record, but not every record, therein to produce a semi-sorted record stream that is roughly sorted based on the primary key of the at least one selected record, but not every record, and to serially store the semi-sorted record stream in the database.

33. A computer program product according to claim 32 wherein the computer-readable program code that is configured to provide the SMSM is further configured to produce the semi-sorted record stream as a series of data files and to serially store the series of data files in the database.

34. A computer program product according to claim 32, further comprising:
computer-readable program code that is configured to provide an index builder that is configured to build an index for the semi-sorted record stream and to store the index in the database.

35. A computer program product according to claim 33 further comprising:
computer-readable program code that is configured to provide an index builder that is configured to build an index file for each of the data files and to store the index files in the database.

36. A computer program product according to claim 35 further comprising:

computer-readable program code that is configured to provide a configuration module that is configured to specify a directory path for the data files and the index files, and to provide the directory path to the SMSM and to the index builder.

37. A computer program product according to claim 32 further comprising:

computer-readable program code that is configured to provide a notification module that is responsive to storing a sequential burst of data records that is received from one of the clients in one of the FIFO queues that is associated therewith, and that is configured to notify the SMSM to produce the semi-sorted record stream.

38. A computer program product according to claim 34 further comprising:

computer-readable program code that is configured to provide a notification module that is responsive to storing a sequential burst of data records that is received from one of the clients in one of the FIFO queues that is associated therewith, and that is configured to notify the SMSM to produce the semi-sorted record stream and to notify the index builder to build the index.

39. A computer program product according to claim 32 wherein the primary key is a timestamp.

40. A computer program product according to claim 32 wherein the at least one selected record in the sequential burst in each FIFO queue comprises a first record in the sequential burst in each FIFO queue.

41. A computer program product according to claim 32 further comprising computer-readable program code that is configured to provide a collection agent at each of the plurality of clients that is configured to collect the sequential bursts of data records from the respective client and to transmit the sequential bursts of data records that are collected to the MSMQB.

42. A computer program product according to claim 32 wherein the sequential bursts of data records from the plurality of clients comprises Quality of Service (QoS) data from the plurality of clients.

43. A computer program product for storing data from a plurality of clients in a database, the computer program product comprising a computer-readable storage medium having computer-readable program code embodied in the medium, the computer-readable program code comprising:

computer-readable program code that is configured to store sequential bursts of data records, which are received from the plurality of clients, in a plurality of First-In First-Out (FIFO) queues, a respective one of which is associated with a respective one of the clients, the data records in the sequential bursts of data being sorted by a primary key;

computer-readable program code that is configured to semi-sort the sequential bursts in the plurality of FIFO queues based on the primary key of at least one selected record, but not every record, therein to produce a semi-sorted record stream that is roughly sorted based on the primary key of the at least one selected record, but not every record; and computer-readable program code that is configured to serially store the semi-sorted record stream in the database.

44. A computer program product according to claim 43 wherein the computer-readable program code that is configured to semi-sort produces the semi-sorted record stream as a series of data files and wherein the computer-readable program code that is configured to serially store comprises computer-readable program code that is configured to serially store the series of data files in the database.

45. A computer program product according to claim 43 further comprising:

computer-readable program code that is configured to build an index for the semi-sorted record stream; and computer-readable program code that is configured to store the index in the database.

46. A computer program product according to claim 44 further comprising:

computer-readable program code that is configured to build an index file for each of the data files; and computer-readable program code that is configured to store the index files in the database.

47. A computer program product according to claim 46 further comprising:

computer-readable program code that is configured to specify a directory path for the data files and the index files.

48. A computer program product according to claim 43 further comprising:

computer-readable program code that is configured to activate the computer-readable program code that is configured to semi-sort in response to activating of the computer-readable program code that is configured to store.

49. A computer program product according to claim 43 wherein the primary key is a timestamp.

50. A computer program product according to claim 43 wherein the at least one selected record in the sequential burst in each FIFO queue comprises a first record in the sequential burst in each FIFO queue.

51. A computer program product according to claim 43 further comprising computer-readable program code that is configured to collect the sequential bursts of data records from the respective client.

52. A computer program product according to claim 43 wherein the sequential bursts of data records from the plurality of clients comprises Quality of Service (QoS) data from the plurality of clients.

\* \* \* \* \*